Sept. 18, 1934.   J. C. HOOVER   1,974,391
FLEXIBLE CONNECTER
Filed April 18, 1932
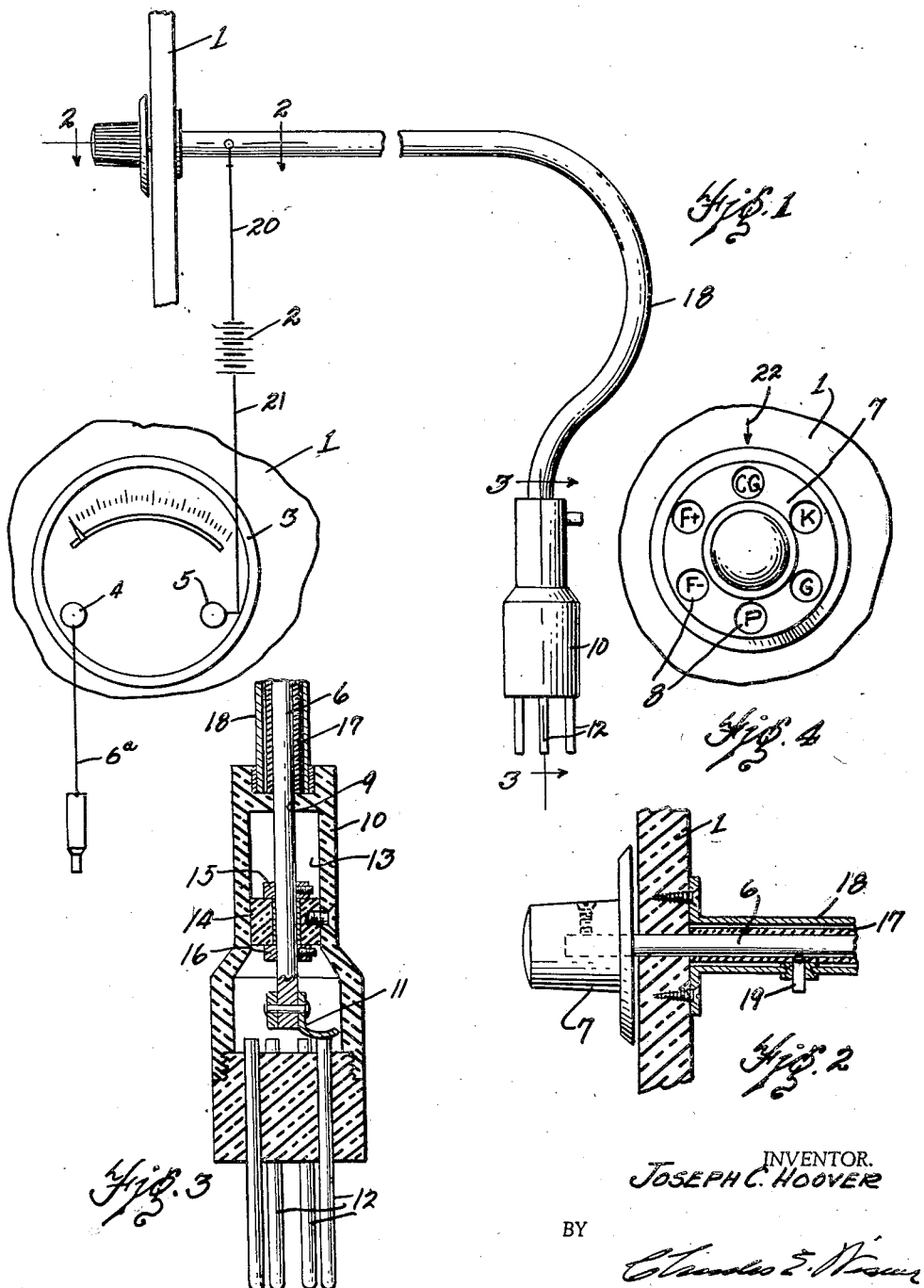
INVENTOR.
JOSEPH C. HOOVER
BY
ATTORNEY.

Patented Sept. 18, 1934

1,974,391

UNITED STATES PATENT OFFICE 1,974,391

FLEXIBLE CONNECTER

Joseph C. Hoover, Detroit, Mich., assignor, by direct and mesne assignments, to B. H. R. Company, Detroit, Mich., a corporation of Michigan Application April 18, 1932, Serial No. 605,871

11 Claims. (Cl. 250—20)

This invention relates to flexible connecters for use with a radio receiving set and an electrical measuring instrument whereby the various circuits of the set may be tested to locate any faults therein.

The principal feature and object of the invention resides in the provision of a flexible connecter to one end of which is attached a plug having prongs thereon for insertion in a tube socket of a radio receiving set and the opposite end of the connecter having a rotating dial connected thereto and having indicia thereon corresponding to the various circuits of the tube socket, the dial arranged to rotate a switch arm whereby the different circuits of the tube socket are placed in series with an electrical measuring instrument and any defects in the circuit are indicated on the electrical measuring instrument.

Another object of the invention resides in the provision of a flexible connecter having a plug with prongs thereon for insertion in a tube socket of a radio receiving set, the flexible connecter provided with manually controlled means, positioned remotely to the plug, whereby the various circuits of the radio receiving set may be placed in series with an electrical measuring instrument, upon operation of the manually controlled means, to thereby test the various circuits of the radio receiving set.

Another object of the invention resides in the provision of a flexible connecter which comprises a single flexible rotatable member whereby the various circuits of the radio receiving set may be placed in series with an electrical measuring instrument upon rotation of the flexible rotatable member, the flexible rotatable member acting as an electrical conductor.

These objects and the several novel features of the invention are hereinafter more fully described and claimed and the preferred form of construction by which these objects are attained is shown in the accompanying drawing in which—

Fig. 1 is an elevational diagrammatic view of my improved flexible connecter.

Fig. 2 is a section taken on line 2—2 of Fig. 1.

Fig. 3 is a section taken on line 3—3 of Fig. 1.

Fig. 4 is an end elevational view of the rotating dial.

Referring to the drawing, the panel 1 may be part of a cabinet for receiving a battery 2, as shown in my co-pending application on Circuit analyzer, Serial Number 581,844. An electrical measuring instrument, preferably an ohmmeter, is installed in the panel 1 and is provided with the usual contacts 4 and 5. The contact 4 has the wire 6a connected thereto which may be connected to the ground terminal of the radio receiving set being tested.

The flexible shaft 6 extends through an aperture in the panel 1 and has the rotating dial or knob 7 suitably secured thereto and as shown in Fig. 4 the dial has the indicia 8 thereon corresponding to the different circuits of the tube socket. The opposite end of the flexible shaft 6 extends through the aperture 9 formed in one end of the plug 10 and has the contact arm 11 suitably secured thereto for successively engaging the ends of each of the prongs 12. The plug 10 is hollow, as indicated at 13, and the bearing 14 is suitably secured therein. The collars 15 and 16 are suitably secured to the shaft 6 and prevent longitudinal displacement of the shaft relative to the plug 10. A flexible sleeve of insulation 17 surrounds the shaft 6 and both the shaft and the insulation are encased in the flexible tube or conduit 18 the same being suitably secured at one end of the plug 10 and at the other end to the panel 1. An electrical contact member 19 engages against the shaft 6 and extends through the insulation 17 and the conduit 18 and is suitably insulated therefrom. The wire 20, as shown in Fig. 1, is connected to the contact 19 and to one terminal of the battery 2 the opposite terminal of the battery being connected by the wire 21 to the terminal 5 of the electrical measuring instrument 3.

It will thus be seen that when the plug 10 is inserted in a tube socket of the radio receiving set and the wire 6 connected to the ground terminal of a radio receiving set that the battery 2 will impress a definite amount of current on the different circuits of the radio receiving set and since the resistance of every circuit in a receiving set is a definite known quantity the resistance reading in ohms, indicated on the electrical measuring instrument, will immediately locate any fault in the circuit being tested. It will be understood, of course, that various types of electrical measuring instruments may be used without departing from the spirit of the invention and scope of the appended claims. When the dial 7 is rotated to bring the letters CG into line with the arrow 22 on the panel 1 a reading of the circuit of the control grid to ground will be indicated on the measuring instrument 3. When the letter K is brought in line with the arrow the reading from cathode to ground will be given. When the letter G is aligned with the arrow the reading from grid to ground will be given and when the letter P is brought into line with the arrow the reading of the circuit of plate to ground will be given. The letters F plus and F minus when brought in line with the arrow will respectively give the reading of the filament positive and filament negative to ground.

It will be understood that although I have shown the current supply from a source externally of the set that nevertheless the device may be used to make dynamic tests.

It will thus be evident that the device is relatively inexpensive to manufacture as only a single electrical conductor is necessary to carry the current from the various circuits of the tube socket to the electrical measuring instrument and likewise the switch is simple in construction and does not involve the necessity of soldering a plurality of electrical conductors to the contact points of the switch as is the case with the usual rotary switch.

Having thus fully described my invention, its utility and mode of operation, what I claim and desire to secure by Letters Patent of the United States is—

1. In a device of the character described, a flexible and rotatable shaft, manually operable means secured to one end of the shaft for rotating the same, a plug secured to the shaft adjacent the opposite end having prongs for insertion in the tube socket of a radio receiving set, an electrical contact member positioned in the plug and secured to the portion of the shaft extending into the plug and adapted to successively contact the ends of the prongs extending into the plug upon rotation of the flexible shaft, an electrical measuring instrument electrically connected to the flexible shaft, means for supplying current through the shaft and plug to the different electrical circuits of the tube socket whereby the condition of each circuit is indicated on the electrical measuring instrument upon rotation of the flexible shaft.

2. In a device of the character described, a plug having prongs extending from one end thereof for insertion in a tube socket of a radio receiving set, a flexible and rotatable member one end extending into the plug, means secured thereto for successively contacting each prong of the plug upon rotation of the flexible and rotatable member, and manually operable means positioned remotely to the plug for rotating the flexible and rotatable member, an electrical measuring instrument electrically connected to the flexible and rotatable member, means for supplying current through the flexible member and plug to the different electrical circuits of the tube socket whereby the condition of each circuit is indicated on an electrical measuring instrument upon rotation of the flexible and rotatable member.

3. In a device of the character described, a flexible and rotatable member, means secured to one end for rotating the same, a plug secured to the flexible and rotatable member adjacent the opposite end having prongs for insertion in a tube socket of a radio receiving set, an electrical contact member positioned in the plug and secured to the flexible member and adapted to successively contact the ends of the prongs extending into the plug upon rotation of the flexible and rotatable member, an electrical measuring instrument electrically connected to the flexible and rotatable member, means for supplying current through the flexible member and plug to the different electrical circuits of the tube socket whereby the condition of each circuit is indicated on the electrical measuring instrument.

4. In a device of the character described, a plug having prongs extending from one end thereof for insertion in a tube socket of a radio receiving set, a flexible and rotatable shaft one end extending into the plug, means secured thereto for successively contacting each prong of the plug upon rotation of the shaft, and manually operable remote control means for rotating the flexible shaft, an electrical measuring instrument electrically connected to the shaft, means for supplying current through the shaft and plug to the different electrical circuits of the tube socket whereby the condition of each circuit is indicated on the electrical measuring instrument upon rotation of the shaft.

5. In a device of the character described, a flexible and rotatable member, a dial secured to one end thereof having indicia thereon corresponding to the circuits of a radio receiving set, a hollow plug secured to the shaft adjacent the opposite end having prongs extending from one end thereof for insertion in the tube socket of a radio receiving set, a spring contact arm secured to the shaft and positioned adjacent the opposite ends of the prongs to those adapted for insertion in the tube socket whereby rotation of the flexible and rotatable member causes the contact arm to successively contact the end of each prong, an electrical measuring instrument electrically connected to the flexible and rotatable members, means for supplying current through the flexible member and plug to the different electrical circuits of the tube socket, externally of the radio receiving set whereby the condition of each circuit is indicated on the electrical measuring instrument upon rotation of the flexible rotatable member.

6. In a device of the character described, a plug having prongs extending from one end thereof for insertion in a tube socket of a radio receiving set, a flexible and rotatable member, one end extending into the plug, means secured thereto for successively contacting each prong of the plug upon rotation of the flexible and rotatable member, manually operable means connected to the opposite end of the flexible and rotatable member for rotating the same, a flexible housing surrounding the flexible and rotatable members, means for insulating the housing therefrom, an electrical measuring instrument having terminals thereon, one terminal connected to the flexible and rotatable members, the other terminal adapted to be connected to the ground terminal of the radio receiving set being tested, and means for supplying current through the flexible member and plug to the different electrical circuits of the tube socket whereby the condition of each circuit is indicated in the electrical measuring instrument.

7. In a device of the character described, a plug having prongs adapted for insertion in a tube socket of a radio receiving set, a flexible shaft like member having one end extending into the plug, means in the plug for electrically connecting the prongs successively with the shaft, an electric circuit electrically connected to the shaft and to the ground terminal of the receiving set, and an electrical measuring instrument in the circuit providing a means for determining the electrical condition of the circuits connected with the tube socket by applying current thereto through the measuring instrument and prongs of the plug.

8. A switch for the purpose described comprising a plug having prongs and adapted for insertion in a tube socket of a radio receiving set to engage the contacts thereof, a flexible rotatable shaft like member having one end extending into the plug, means connected with the portion of the said shaft member within the plug and through rotation adapted to successively electrically connect the prongs and the shaft.

9. A switch for the purpose described comprising a plug having a hollow body, a series of prongs projecting from the end of the body and at the opposite end projecting into the hollow interior, said plug being adapted to be inserted in a tube socket of a receiving set with the externally projecting prongs respectively in engagement with the terminals of the socket, a flexible shaft having a rotatable portion extending into the plug, a mounting therefor in the hollow body of the plug holding the same from longitudinal movement, a single contact element secured to the shaft within the hollow body and movable to engagement successively with the prongs extending into the body.

10. In apparatus of the character described, a plug having a series of more than two prongs and adapted for insertion into the tube socket of a radio receiving set having terminals corresponding in number to the number of prongs, a flexible shaft like member having one end extending into and rotatably mounted in the plug adjacent the said prong parts extending into the plug, a contact means on the shaft adapted through rotation of the shaft, to successively contact the prongs, the flexible shaft permitting the plug to be manually moved from socket to socket of the set in the testing thereof, a flexibly supported, rotatable, dial at the opposite end of the flexible shaft through rotation of which the shaft portion in the plug may be rotated to contact specific prongs thereof in accordance with the dial indications, and a potentially energized electric circuit and measuring instrument therein associated with the aforesaid elements to apply current through the successive prongs of the plug to the terminals of the socket being tested to thereby provide a reading of the electrical condition of the circuit connected with said terminals.

11. In apparatus of the character described, a plug having a series of more than two prongs projecting from one end thereof and extending into the plug, said plug being insertible into a tube socket of a radio receiving set having a series of more than two electric terminals with the said prongs in contact respectively with the said terminals thereof, a flexible and rotatable shaft like member having one end extending into and rotatably supported in the plug, a contact means on the shaft portion within the plug through rotation of which each prong of the plug may be electrically connected in succession with the shaft, the said flexible shaft permitting manual removal and insertion of the plug in the various tube sockets of the set in the testing thereof, a fixedly supported rotatable dial having indications corresponding to the several prongs of the plug and connected with the opposite end of the flexible shaft through rotation of which dial the shaft may be rotated to move the said contact thereon to engage specific prongs corresponding to the dial indications, an electric circuit connected with the ground of the receiving set under test and with the shaft, a source of electric energy, and an electrical measuring instrument in the said circuit, said circuit being completed through the contact element of the shaft and contacted prong in the plug to thereby energize the circuit of the set whose terminal is contacted by the prong as indicated by the dial.

JOSEPH C. HOOVER.